May 31, 1966 W. M. SILLERS, JR 3,254,242

DELAY TIMING CIRCUIT

Filed May 23, 1963

INVENTOR
W. M. SILLERS, JR.
BY
ATTORNEY

United States Patent Office 3,254,242
Patented May 31, 1966

3,254,242
DELAY TIMING CIRCUIT

William M. Sillers, Jr., Mendham, N.J., assignor to Bell Telephone Laboratories, Incorporated, New York, N.Y., a corporation of New York Filed May 23, 1963, Ser. No. 282,603
7 Claims. (Cl. 307—88.5)

This invention relates to timing circuits and more particularly to charge-discharge circuits arranged to provide accurately-timed, extended delay intervals.

So-called delay timers find a wide variety of applications in electronic control circuitry for accurately determining the interval between related operations to be performed by the device under control. The most common delay timing circuit constitutes the well-known resistance-capacitance network in which a capacitor is charged or discharged to an initial condition to initiate a timing interval and then is allowed to return exponentially to its original condition, introducing a delay the extent of which depends upon the capacitance and resistance involved in the circuit. Such circuits are limited in available delay by the necessity of providing ever larger capacitances or higher and higher impedances in the resistive branch. This limitation becomes of particular significance when a resistance-capacitance delay network is associated with transistor circuitry, since the shunt impedance of the network becomes so great that it becomes impossible to switch the control transistor between ON and OFF states.

It is accordingly the object of the present invention to extend the timing interval afforded by resistance-capacitance delay circuits and, further, to accomplish such extended timing performance in circuitry involving transistor amplifiers in the controlled network.

In view of the above object, there is provided in accordance with the invention, a delay timing circuit in which a source of potential is associated with a resistance-capacitance network and a controlled transistor, the emitter-collector path of the transistor being connected across the source of the potential. A storage capacitor is connected by one terminal to the base of the transistor, and a discharge circuit for the capacitor is connected between the base of the transistor and the terminal of the potential source required to forward bias the base-emitter circuit of the transistor. The discharge circuit includes, in series, a fixed resistive impedance and a second element, the impedance of which varies as a function of applied potential, this latter impedance comprising, for example, a solid-state diode poled with its direction of easy conduction the same as that of the base-emitter circuit of the transistor. The other terminal of the capacitor is normally connected to the same terminal of the potential source as the collector of the transistor, and switch means are provided for effectively transferring the connection of the other terminal of the capacitor to the other terminal of the potential source to initiate a timing cycle.

The above and other features of the invention will be described in detail in the following specification, taken in connection with the drawing, in which.

Figure 1:
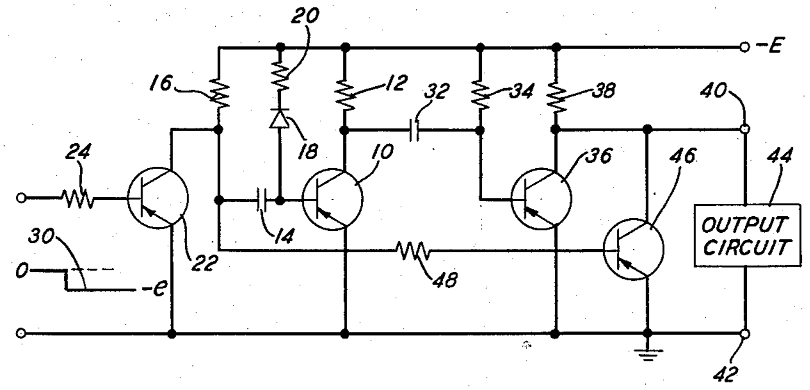
FIG. 1 is a circuit schematic diagram of a delay timing circuit according to the invention.

As shown in FIG. 1, a transistor 10 having base, collector, and emitter elements is connected between the negative terminal —E of a source of potential and ground, with the emitter-collector circuit in series with a resistor 12. A timing capacitor 14 is connected by its right-hand terminal to the base of transistor 10 and its left-hand terminal is connected through a resistor 16 to the negative terminal —E of the source of potential. The base of transistor 10 is connected to the negative terminal —E of the source of potential by way of a solid-state diode 18 poled in its direction of easy conduction and a resistor 20. A switching transistor 22 is connected with its emitter-collector circuit in series between the left-hand terminal of capacitor 14 and ground and its base connected by way of a series resistor 24 to an input terminal 26 between which terminal and a second input terminal 28 a switching signal, shown in waveform 30 as selectively either 0 (ground) or —*e* volts, is applied. When the switching potential is 0, transistor 22 represents essentially an open circuit between the left-hand terminal of capacitor 14 and ground. On the other hand, when the waveform 30 changes to the second value, transistor 22 is driven into saturation and the left-hand terminal of capacitor 14 is brought effectively to ground potential. Consideration of the balance of the circuit shown in FIG. 1 may be deferred until the operation of the basic delay timing network thus far described has been considered in detail.

Figures 2, 3, 4:
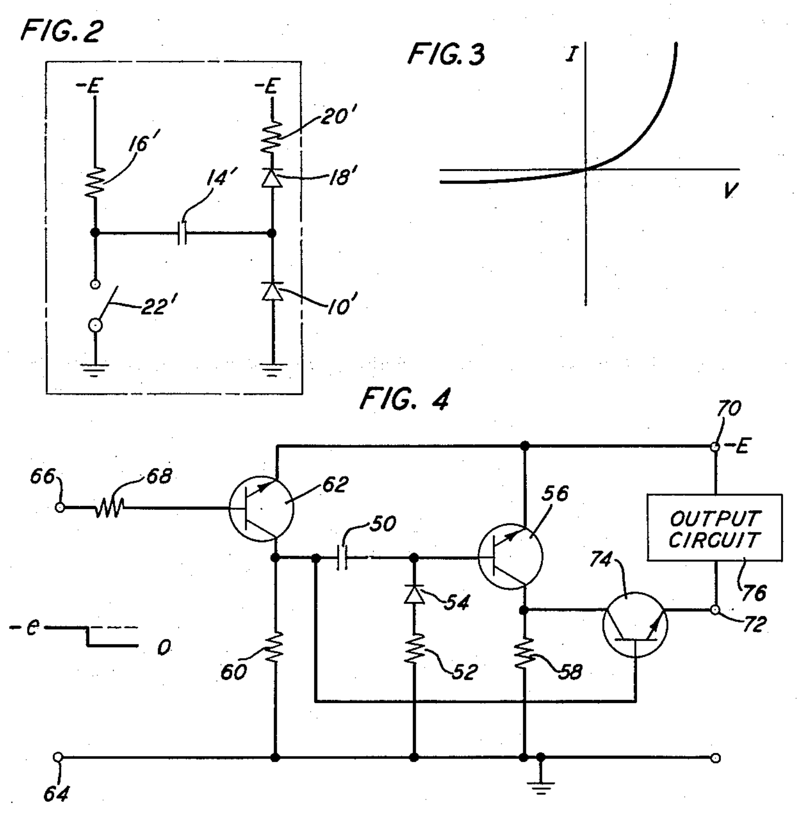
FIG. 2 is a partial equivalent circuit which will be useful in describing the operation of the circuit of FIG. 1.
FIG. 3 is a graph showing the impedance characteristic of the solid-state diode employed in the circuit of FIG. 1.
FIG. 4 is a circuit schematic diagram of an alternative delay timing circuit, also in accordance with the invention.

For a more detailed understanding of the delay circuit operation, reference may be had to FIG. 2 of the drawing which is an equivalent circuit of the essential elements in which equivalent elements bear the same reference characters, primed, as the actual elements in FIG. 1. Thus, the source of potential is shown as between a terminal labeled —E and ground, capacitor 14' is connected to the terminal —E by way of a diode 18' poled in the direction of easy conduction, and a resistor 20'. The other terminal of capacitor 14' is connected to —E, the terminal of the source of potential, and selectively to ground by way of a switch 22', which corresponds in function to transistor 22 of FIG. 1. The junction between the anode of diode 18' and the right-hand terminal of capacitor 14' is connected to ground through a diode 10' which represents and is the functional equivalent of the base-emitter circuit of transistor 10. It will be recognized that when switch 22' is open, as shown in the drawing, current may flow from ground through the diode 10', capacitor 14', and a resistor 16' to the potential —E. Current also flows, of course, through diode 18' in the direction of easy conduction and resistor 20' to the potential —E. It will be recognized that when steady-state conditions have been reached, capacitor 14' will be so charged that its left-hand terminal is at a potential —E and its right-hand terminal is at a potential corresponding to the drop in the forward direction across the base-emitter circuit of the transistor. If one assumes, for purpose of explanation, that —E is equal to —12 volts and the forward drop in the base-emitter circuit of transistor 10 is .5 volt, the potential across capacitor 14' at steady-state conditions is approximately —11.5 volts with respect to ground.

If, now, switch 22' is closed, this action corresponding to the application of a switching potential to the base of switching transistor 22 of FIG. 1 of the drawing, the lower terminal of capacitor 14' is raised from a potential of —E to ground or, in the case chosen for example, to a potential of 0 volts. Until discharge of the capacitor begins, the right-hand terminal thereof, and thus the base of transistor 10, is driven more positive by the potential across the capacitor. Under these circumstances, diode 10' (the base-emitter circuit of transistor 10 in FIG. 1) is back-biased and current flow through this path is interrupted. Transistor 10 is thus cut off and an appropriate change in potential drop occurs across resistor 12 of FIG.

1. At the same time, however, diode 18', corresponding to diode 18 of FIG. 1, is strongly forward biased and saturation current in a direction to discharge capacitor 14 at once begins to flow.

Reference to FIG. 3 of the drawing, which is a typical voltage-current characteristic for a solid-state diode, such as diode 18, indicates that the impedance of the diode in the forward direction is both constant and relatively low. As the capacitor discharges, however, the forward potential applied to diode 18 begins to fall and, as illustrated in FIG. 3, reaches the knee of the impedance characteristic. Thus, as the potential across the capacitor is increasingly reduced, the impedance through which the capacitor must discharge becomes correspondingly greater. This has the effect of lengthening the time interval which must transpire before the capacitor is fully discharged. When the potential at the base of transistor 10 falls to ground, the transistor again becomes forward biased and begins conduction, serving both to initiate recharge of the capacitor, providing that switch 22 has again been opened, and restoring the original output signal condition across resistor 12.

Here involved is an important feature of the invention. It will be recognized that the use of diode 18 permits the transistor 10 to be controlled effectively and at the same time makes possible the achivement of greatly extended delay intervals. If a single high resistance impedance element were substituted for diode 18 and resistor 20, the RC constant of the timing circuit would, of course, be increased. At the same time, however, the impedance in the discharge path would be so great at the initiation of the discharge cycle that it would be difficult, if not impossible, to turn off transistor 10, thus signaling the initiation of the timing interval. In actual circuitry involving the arrangement of the invention, timing delays have been increased by a factor of the order of seven or eight without loss of positive control of the switching of the controlled transistor.

The balance of the circuit shown in FIG. 1 of the drawing constitutes a conventional RC pulse forming circuit comprising a capacitor 32 and a resistor 34 by means of which change in the level of the output wave across resistor 12 at the end of the timing interval is converted to a short pulse which is applied to the base of a transistor amplifier 36, the emitter-collector circuit of which is connected across the source of potential between —E and ground by way of a series resistor 38. This circuit network operates in conventional manner. Thus, capacitor 32 is charged by way of the base-emitter circuit of transistor 36 and resistor 12 when transistor 10 is cut off and discharges through resistor 34 when transistor 10 is driven to saturation upon completion of the timing interval afforded by the delay circuit in the first stage. The pulse output appearing between the collector of transistor 36 and ground is applied to output terminals 40 and 42 between which an output circuit of any desired characteristic may be connected. Thus, output circuit 44 may constitute the control element of an amplifier or transistor switch, an indicator, the winding of a relay or the like, depending upon the application to be made of the delay timer.

It is apparent that two or more delay timer stages may be connected in tandem if extremely long delay intervals are required. It is also possible to combine the long delay interval afforded by the timer of the invention with a shorter interval obtained by the connection in tandem of a conventional RC delay circuit. In each instance, the provision of a pulse forming circuit at the output of the final delay stage is optional and depends upon whether a pulsed output is required in the particular application.

Because of the long delay intervals afforded by the timing circuit of the invention, it may be possible in some circumstances that the switching voltage will return to the lower value before the timer has timed out the entire interval. Under these circumstances, it may be desirable to prevent the appearance of an output when the timing interval ultimately expires. To this end and as shown in FIG. 1 of the drawing, a switching transistor 46 is provided to shunt the output and is connected by way of its emitter-collector circuit between output terminals 40 and 42. Normally, transistor 46 is maintained in saturation by a potential derived from the negative terminal of the power supply by way of resistor 16 and a series resistor 48. When, however, a switching cycle is initiated, the potential of the base of transistor 46 is reduced effectively to ground through the action of transistor 22 and transistor 46 is cut off, thus permitting an output to appear between terminals 40 and 42. In the event, however, that the switching signal reverts to its initial condition before the timer has timed out, transistor 46 will again be biased to saturation, thus preventing the appearance of a spurious output when the timer ultimately completes the timing cycle.

FIG. 4 of the drawing illustrates an alternative circuit configuration, according to the invention, embodying the same principles as the circuit of FIG. 1. Basically, the two circuits differ only in that in FIG. 1 of the drawing, pnp type transistors are employed, while in FIG. 4, npn type transistors are employed. Appropriate changes in the connections between the source of potential and the transistor elements are, of course, required. As shown in FIG. 4 of the drawing, a timing capacitor 50 is provided with a discharge circuit comprising a variable resistor 52 and a diode 54 poled with the direction of easy current flow between ground and the base of a control transistor 56. The emitter-collector circuit of transistor 56 is connected between the negative potential at —E and ground by way of a series resistor 58 with the base-emitter circuit poled in the direction of easy current flow. As in the arrangement of FIG. 1, timing capacitor 50 is initially charged by current flowing between ground and the left-hand terminal of the capacitor by way of a series resistor 60 and the base-emitter circuit of transistor 56, and a switching transistor 62 is connected by way of its emitter-collector circuit between the left-hand terminal of timing capacitor 50 and the negative terminal of the current source —E, switching transistor 62 being normally cut off by a potential of appropriate polarity applied between input terminals 64 and 66, the latter terminal being connected to the base of transistor 62 by way of a series resistor 68. When a switching voltage of the other value is applied between input terminals 64 and 66, transistor 62 is saturated and the timing cycle proceeds in the same manner as that which occurs in the arrangement of FIG. 1.

Although, as in the case of the circuit of FIG. 1, a second stage of timing delay may be added, if required, the output of transistor 56 appearing across resistor 58 is shown in FIG. 4 connected to terminals 70 and 72 by way of the emitter-collector circuit of a gating transistor 74. As in the case of gating transistor 46 of FIG. 1, the base of transistor 74 is returned to the collector of switching transistor 62 in such manner that when a switching signal is applied to initiate a timing cycle, transistor 74 is unblocked, permitting transmission of an output to output circuit 76. If the switching signal is removed before the timing cycle has been completed, the bias voltage is removed from transistor 74, cutting off conduction through this transistor and preventing appearance of an output between output terminals 70 and 72 when the timing cycle is ultimately completed.

What is claimed is:

1. A delay timing circuit comprising a storage capacitor, a source of potential, a controlled transistor having base, emitter, and collector elements, a discharge path for said capacitor comprising the series combination of the base emitter circuit of said transistor, a solid-state diode rectifier connected with its direction of easy conduction the same as that of the base-emitter circuit of said controlled transistor and a resistive impedance, one terminal of said capacitor being connected to the base of said transistor, means connecting the emitter-collector path of said trasistor across said source of potential in the polarity required to forward bias said base-emitter circuit, and switching means connected to the other terminal of said capacitor to apply substantially the full potential of said source to said terminal to initiate a timing interval.

2. A delay timing circuit comprising a source of potential, a transistor having base, emitter, and collector elements, means connecting the emitter-collector path of said transistor across said source of potential, a storage capacitor, means connecting one terminal of said capacitor to the base of said transistor, a discharge circuit for said capacitor connected between the base of said transistor and the terminal of said source required to forward bias the base-emitter circuit of the transistor and including, a series, a resistive impedance and a solid-state diode poled with its direction of easy conduction the same as that of the base-emitter circuit of said transistor, means normally connecting the other terminal of said capacitor to the same terminal of said source as said collector, and switch means effectively transferring the connection of said other terminal to the other terminal of said source to initiate a timing cycle.

3. A delay timing circuit comprising a source of potential, a transistor having base, emitter, and collector elements, means connecting the emitter-collector path of said transistor across said source of potential, a storage capacitor, means connecting one terminal of said capacitor to the base of said transistor, a discharge circuit for said capacitor connected between the base of said transistor and the terminal of said source required to forward bias the base-emitter circuit of the transistor and including, in series, a resistive impedance and a solid-state diode poled with its direction of easy conduction the same as that of the base-emitter circuit of said transistor, means normally connecting the other terminal of said capacitor to the same terminal of said source as said collector, switch means effectively transferring the connection of said other terminal to the other terminal of said source to initiate a timing cycle, means for abstracting an output from the emitter-collector circuit of said transistor, and means for blocking the output so abstracted if said switch means is returned to the normal connection before the expiration of the timing cycle.

4. A delay timing circuit comprising a source of potential, a transistor having base, emitter, and collector elements, means connecting the emitter-collector path of said transistor across said source of potential, a storage capacitor, means connecting one terminal of said capacitor to the base of said transistor, a discharge circuit for said capacitor connected between the base of said transistor and the terminal of said source required to forward bias the base-emitter circuit of the transistor and including, in series, a resistive impedance and a solid-state diode poled with its direction of easy conduction the same as that of the base-emitter circuit of said transistor, and an input switch comprising a transistor connected with its emitter-collector circuit between the other terminal of said capacitor and said other terminal of said source of potential and responsive to a change in input voltage applied to its base effectively to transfer the connection of the other terminal of said capacitor to the other terminal of said source of potential to initiate a timing cycle.

5. A delay timing circuit comprising a source of potential, a transistor having base, emitter, and collector elements, means connecting the emitter-collector path of said transistor across said source of potential, a storage capacitor, means connecting one terminal of said capacitor to the base of said transistor, a discharge circuit for said capacitor connected between the base of said transistor and the terminal of said source required to forward bias the base-emitter circuit of the transistor and including, in series, a resistive impedance and a solid-state diode poled with its direction of easy conduction the same as that of the base-emitter circuit of said transistor, an input switch comprising a transistor connected with its emitter-collector circuit between the other terminal of said capacitor and said other terminal of said source of potential and responsive to a change in input voltage applied to its base effectively to transfer the connection of the other terminal of said capacitor to the other terminal of said source of potential to initiate a timing cycle, means for abstracting an output signal from the emitter-collector circuit of said transistor and a gate circuit comprising a transistor, the emitter-collector path of which controls the passage of said output through said abstracting means, and means connecting the base circuit of said transistor to the other terminal of said capacitor.

6. A delay timing circuit comprising a source of potential, a transistor having base, emitter, and collector elements, means connecting the emitter-collector path of said transistor across said source of potential, a storage capacitor, means connecting one terminal of said capacitor to the base of said transistor, a discharge circuit for said capacitor comprising an impedance, the magnitude of which varies inversely with the potential applied thereto, connected between the base of said transistor and the terminal of said source required to forward bias the base-emitter circuit of said transistor, means normally connecting the other terminal of said capacitor to the same terminal of said source as said collector, and switch means effectively transferring the connection of said other terminal to the other terminal of said source to initiate a timing cycle.

7. A delay timing circuit comprising a source of potential, a transistor having base, emitter, and collector elements, means connecting the emitter-collector path of said transistor across said source of potential, a storage capacitor, means connecting one terminal of said capacitor to the base of said transistor, a discharge circuit for said capacitor connected between the base of said transistor and the terminal of said source required to forward bias the base-emitter circuit of said transistor and including, in series, a resistive impedance and a solid-state diode poled with its direction of easy conduction the same as that of the base-emitter circuit of said transistor, means normally connecting the other terminal of said capacitor to the same terminal of said source as the collector of said transistor, switch means effectively transferring the connection of said other terminal of said capacitor to the other terminal of said source to initiate a timing cycle, and a pulse forming circuit connected to abstract an output from said transistor when said capacitor is discharged to produce a pulse for application to an output circuit.

No references cited.

ARTHUR GAUSS, *Primary Examiner.*

B. P. DAVIS, *Assistant Examiner.*